United States Patent

[11] 3,543,823

[72] Inventor James L. Keen
 New Brighton, Minnesota
[21] Appl. No. 709,946
[22] Filed March 4, 1968
[45] Patented Dec. 1, 1970
[73] Assignee General Mills, Inc.,
 a corporation of Delaware

[54] PROCESSING OF ENDOSPERM SPLITS
 12 Claims, No Drawings

[52] U.S. Cl. .................................................. 146/221.9;
 99/98; 241/8
[51] Int. Cl. .................................................. B02b 3/04;
 B02c 4/00; B23b 1/30
[50] Field of Search .......................................... 146/221.8,
 221.9, 221.7; 241/6, 9, 12; 99/98

[56] References Cited
UNITED STATES PATENTS

| 1,136,501 | 4/1915 | Andrews ..................... | 241/6 |
| 2,131,674 | 9/1938 | Salomon et al. ............. | 241/12X |
| 3,132,681 | 5/1964 | Keen et al. .................. | 146/221.8 |
| 3,318,536 | 5/1967 | Graumann ................... | 241/6 |

FOREIGN PATENTS

| 539,066 | 4/1957 | Canada ....................... | 241/12 |

Primary Examiner—W. Graydon Abercrombie
Attorneys—Anthony A. Juettner, William C. Babcock and Jermoe J. Jenko ABSTRACT: An improved process of treating seeds containing galactomannan polysaccharides wherein endosperm splits are flaked to a particle thickness of less than 25 microns at a moisture content of 30 to 70 percent resulting in a product rapidly dispersible in water which produces unexpectedly high viscosity aqueous sols useful in papermaking, drilling muds, food stuffs, and printing pastes.

PROCESSING OF ENDOSPERM SPLITS

The present invention relates to a process of treating seeds containing galactomannan polysaccharides in such a manner so as to produce a mucilaginous material which is rapidly dispersible in water to produce aqueous sols of unexpected high viscosity. In particular this invention relates to a process of flaking or squeezing endosperm sections of galactomannan polysaccharide containing seeds.

This invention involves the use of seeds from the plant family "Leguminosae" such as tara, guar, locust bean, honey locust, palo verde, and other seeds which contain neutral polysaccharides of high molecular weight with numerous short branches. These polysaccharide gums have the ability to swell greatly in water to produce viscous sols. Locust bean and guar seeds are especially valuable for their polysaccharide content. These seeds or beans have a nominal diameter of approximately three-sixteenths of an inch for guar seeds and approximately five-sixteenths of an inch for locust seeds. The structure of the bean, in both cases, is such that it consists of two hemispheric endosperm pieces, one on either side of two adjacent disk-shaped germ pieces with the whole covered by a layer of hull material. The hull is thin and hard; the endosperm is very hard, and the germ is soft and pliable. When the beans are submitted to an impact, the endosperm sections split, generally in half. The embryo or germ may likewise split remaining attached to endosperm sections. The germ may be detached and ground. Such endosperm half sections are hereinafter referred to as "splits." The endosperm splits are extremely tough and have a normal moisture content of 10–12 percent. It is normally desirable to remove the hull from the outer covering of the splits. A suitable method of splitting and dehulling the guar beans to get at the endosperm splits is disclosed in U.S. Pat. No. 3,132,681. Preferably the beans are split and sifted to separate splits and germ. The splits are heated with steam to loosen the hull and stabilize the endosperm. The splits are cooled and then subjected to controlled impact sufficient to loosen the hull. The hull becomes broken and ground as a result of impact and abrasion with other particles during milling. Suitable impact is provided by a hammer mill.

The product from the dehulling mill is sifted in conventional equipment fitted with screens of proper size to pass the broken and ground hull particles while retaining the germ-free, dehulled, coarser sized endosperm product. Any germ fragments which might still be clinging to the endosperm after the splitting step are dislodged and separated during the dehulling step. The hull fraction is recovered as a byproduct. The endosperm product is ground to guar gum for commercial usage.

Optionally, the product from the dehulling mill is die divided in the sifter into three fractions, namely, the hull byproduct fraction which may also contain some fine bean meal, the large endosperm splits, and an intermediate fraction composed of middling splits and meal. This intermediate fraction is then subjected to a gravity table to recover the smaller and broken endosperm splits which are combined with the large endosperm splits to make up the endosperm product.

It has now been found that the mucilaginous material when processed as disclosed herein is unexpectedly, rapidly, water dispersible and produces aqueous sols of unexpected fast solution or rapid hydration and high viscosities. In order to obtain these results it has been found that the splits must be reduced to a thickness of less than 25 microns.

This invention in its broadest sense encompasses the processing of splits wherein the splits are reduced to a thickness of less than 25 microns, desirably less than 20 microns, and preferably less than 15 microns, at a tempered moisture content of 30–70 percent, desirably 43–62 percent and preferably 48–56 percent. When processing the splits as disclosed herein, each split undergoes a size expansion, i.e. the surface area each split covers is expanded approximately 100–150 times or more. It has been calculated that an average split particle covers an area of approximately 0.07 cm.$^2$ and after processing is expanded to cover an area of 7.0–10.5 cm.$^2$. By submitting the splits to such processing, i.e. a thickness of less than 25 microns, the cells and cell walls of the splits apparently rupture and are squeezed empty so that the galactomannan gum is free to rapidly dissolve and rapidly hydrate and to cause the high viscosities in aqueous sols.

When practicing a preferred embodiment of this invention, splits are tempered until the moisture content is preferably 43–62 percent. The tempered splits are then ruptured or flaked, preferably between two rolls so that the tempered split is reduced to a flake thickness of less than 25 microns causing the gum to diffuse or be squeezed from the cell.

When processing splits, it is preferable to temper the splits by treating with water to increase the moisture content. Such a treatment softens the splits. When tempering, the splits usually expand in size. A guar bean split usually expands approximately 100 percent in volume at 50 percent moisture content. The tempering step is a process of moisture equilibration within the individual split; the equalizing of moisture from the periphery to the heart or center of the individual split. Since it involves moisture transfer through individual cells, and cell walls from the periphery to the heart or center of the split, tempering requires time. Generally 20–30 minutes is sufficient at ambient temperature to allow moisture equilibration but times up to 1 hour have been satisfactorily used. When processing the splits after dehulling and tempering to produce a flake of less than 25-micron thickness, it is preferable to pass the tempered split between flaking rolls. It has been determined that rolls set with a feed rate such that flake thickness in the nip is 10–12 microns will give a product with a 2-minute viscosity approaching 6,000 centipoises. Rolls set with a feed rate such that flake thickness in the nip is 40 microns and above will produce considerably lower 2-minute viscosities.

Since, the split is reduced in thickness to less than 25 microns and expanded in area to approximately 100–150 times its original area, many physical processing properties may significantly influence the final flake size. If flaking rolls are used, the physical characteristics of the rolls may be important. Roll pressure, roll diameter, uniformity of roll diameter, nature of the surface of the roll, roll r.p.m., roll temperature, feed rate, nip width, and position of the flaker knives may be contributing variables. For instance when operating the laboratory flaking rolls at a constant feed rate and at 1,800 pounds gage pressure on the rolls, significant improvement was apparent in the viscosity over extended operating times. Such a result can be attributed to the heating of the rolls which in turn caused better contact between rolls and to an easier disruption of the split at higher temperature. Actual physical measurements of the nip width became difficult in the less than 0.001-inch range. However, when rolls were kept from contact at 50 microns, or 0.002 inches, significant viscosity improvements were not obtained indicating that squeezing below the 50 microns was necessary. Many experimental runs have shown that squeezing of the split to less than 25 microns will give viscosities which are twice the viscosities obtained with particle thicknesses greater than 25 microns. This phenomenon will be further illustrated by the examples.

Other methods of reducing the splits to the particle thickness may be through extrusion with a screw extruder wherein the screw passes within less than 25 microns of the extruder wall. Likewise, squeezing of the splits between plates may also produce the desired results. The feed material may be squeezed by forcing the split through a slit having a height of less than 25 microns. However, flaking rolls were most conveniently used. Chrome-plated steel or stainless steel rolls were most satisfactory. Other methods of obtaining such squeezing action on the splits will be apparent to those skilled in the art.

When practicing a preferred embodiment of this invention a suitable flow sheet would be as follows.

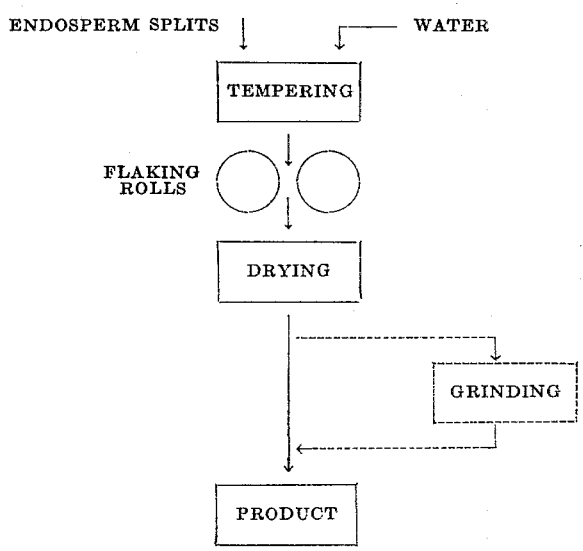

The endosperm splits would be tempered in water to the preferred moisture content of 43—62 percent. The tempered, softened splits would be fed to the squeezing forces, preferably flaking rolls and squeezed to a thickness less than 25 microns. The squeezed splits would then be dried and collected as product. Optionally, the squeezed splits could be ground to various mesh sizes and dried. The grinding and drying could be done simultaneously. If grinding was used, it may be desirable to classify the ground, squeezed, split flakes according to particle size since finely ground produce may be more desirable for certain applications.

For convenience of operating in the laboratory, laboratory sized equipment was used. The small scale equipment consisted of:

1. A 1-inch diameter variable screw feeder capable of feed rates of 0—400 grams per minute feeding to;
2. a small laboratory flaker fitted with a hydraulic system to control roll pressure and insure contact in the nip of the rolls and a set of sprockets and gears for speed variations of the rolls, and a set of two knives on each roll to remove the flakes and clean the rolls;
3. two heat guns used to dry the flakes and capable of temperatures of up to 750° F. which were mounted in a tubular connection between the bottom of the flaker and a conveyor drier;
4. a section of electric conduit 1½ inches in diameter by approximately 223 feet long which was insulated and connected in six oblong loops to serve as a conveyor drier;
5. a small collection cyclone (6 inches in diameter × 2.5 inches in diameter × 24 inches long) connected to the drier and discharging into a widemouth collection bottle; and
6. an industrial vacuum cleaner connected to the cyclone to provide a means of conveying the flakes through the drier and the cyclone.

The drier and flaker were fitted with thermometers at various points and the whole of the other equipment was made to be as reproducible and controllable as possible. Total time, feeder exit to collection bottle, was approximately 12 seconds. Flakes were preferably dried to less than 15 percent moisture in order to prevent spoilage.

Of primary importance was the laboratory flaker which consisted of two chrome-plated, steel rolls which were 5.75 inches in diameter and 6 inches wide. The usable width of the rolls was usually 3.5 inches, although the full 6-inch width could be used if desired. The roll r.p.m. could be varied from 16—210 r.p.m. The bearings holding one roll were not movable while the bearings holding the other roll were movable. A small hydraulic cylinder on each movable bearing held the rolls in contact. The area of pressure on each hydraulic cylinder was 0.995 square inches and the cylinders had a pressure limit of about 2,000 p.s.i.
p.s.i.

Flaking runs were made at various pressures. Since the pressure is a variable for determining flaked particle thickness it was found that a minimum of about 1,200 pounds pressure (gage) was needed on the laboratory flaker and pressures as high as 2,000 pounds could be obtained on the laboratory equipment. However, minimum pressure will vary with the type of equipment, i.e. hydraulic cylinders, roll width, roll diameter, etc. It was found that flaked product viscosity, especially 2-minute viscosity increases with flaking pressure, while all else is constant within acceptable limits. Where possible, the nip width between the rolls was measured, but when operating in the area of 0.001-inch width, physical measuring means, i.e. feeler gages and shim stock, became impossible. Therefore, flake thickness or parting of the rolls was determined by calculation at a feed rate of 1 gram moisture free basis (M.F.B.)/roll revolution. It is known that 1 gram of splits on a moisture free basis will weight approximately 1.93 grams at 48 percent moisture. The density of the endosperm split is approximately 1.5, of water 1 and thus at 48 percent moisture content the density of the split will be approximately 1.26. Therefore, a 1 gram M.F.B. of endosperm splits will occupy 1.53 cm.$^3$ at 48 percent moisture. Using the laboratory flaker at a feed rate of 1 gram M.F.B./roll revolution over the effective flaking area of 8.9 centimeters (flaking width in cm.) by 46 centimeters (roll circumference in cm.) the flake thickness of 48 percent moisture flakes would be 37 microns at a roll pressure sufficient to squeeze splits as thin as possible, in this case, about 1,800 pounds. Using this as the basis, various feed rates were run on the flaker resulting in various flake thicknesses. The results are summarized in the examples. When operating the flaker, the dry flaker product was removed from the cyclone and broken so as to pass an 8-mesh screen. Flake viscosity was determined by using a blender motor and a Variac, a 500 milliliter blender jar and cover, and a Brookfield Viscometer. To determine viscosity, 5 grams dry weight of gum were added to 495 milliliters of distilled water at 25° C. The procedure was to place 250 cc. of water in the jar and set the Variac at 20—30 volts. The gum was added and mixed in the blender for 10 seconds. The remainder of the water was added to the stopped blender. The cover was placed on the blender and at 30 seconds the blender was turned on and set at maximum speed and allowed to mix for 1 minute. Using the Brookfield Viscometer with a No. 4 spindle at 20 r.p.m. the viscosity was read at exactly 2 minutes and again at 2 hours. The results are summarized in the examples.

When using other methods and other equipment to squeeze guar splits to less than 25 microns, optimum operating conditions are easily obtainable through these simple laboratory testing techniques. Methods of obtaining optimum conditions on other equipment will be readily apparent to those skilled in the art.

The squeezed splits or dry flakes when processed according to the teachings of this invention produce a product with superior viscosity producing properties and eliminates the requirement of subsequent grinding. The coarse products produced by the process of this invention are readily water dispersible. This behavior essentially eliminates the tendency for the formation of lumps in the aqueous sols. The squeezed endosperm or dry flakes may be dispersed directly in water in certain applications; however, the processed flakes may be reduced to a coarse size range, such as primarily between 30 and 100 mesh, and 40 and 200 mesh. The flakes may be further reduced to a finely divided condition, such as all 200 mesh and all 325 mesh for various other applications. Flakes ground to finer mesh sizes do tend to produce slightly higher viscosities, i.e. up to 10 percent greater than the same product left coarsely sized, i.e. larger than about 150 mesh.

The following examples will further illustrate but are not intended to limit the scope of this invention.

EXAMPLE I

Endosperm splits were prepared as disclosed in assignee's U.S. Pat. No. 3,132,681, by Keen. The splits were tempered to an equilibrium moisture content of 48.5—51 percent over approximately a 1 hour period. The tempered splits were fed to the laboratory flaker as described above. Viscosities were determined as indicated above. The results and operating conditions are summarized in table I.

TABLE I

| Feed rate, grams M.F.B./roll rev. | Flake thickness, microns | Roll speed, r.p.m. | Roll temp., °F. | Feed moisture content percent water | Roll pressure, lbs. gauge | 2 minute viscosity, cps. | 2 hour viscosity, cps. |
|---|---|---|---|---|---|---|---|
| 1.05 | 38.48 | 96 | | 48.5 | 1,800 | 2,150 | |
| 0.65 | 24.05 | 16 | | 51.0 | 1,800 | 2,800 | 7,950 |
| 0.48 | 17.76 | 145 | 180 | 48.0 | 1,800 | 4,550 | 7,750 |
| 0.47 | 17.39 | 145 | 179 | 48.0 | 1,800 | 4,600 | 7,900 |
| 0.44 | 16.28 | 145 | 177 | 48.0 | 1,800 | 4,650 | 7,800 |
| 0.42 | 15.24 | 145 | 170 | 48.0 | 1,800 | 5,250 | 8,400 |
| 0.25 | 9.25 | 96 | | 48.5 | 1,800 | 5,600 | 8,300 |

EXAMPLE II

Example I was repeated except that a higher moisture content was present in the feed material and the flakes from the flaker were not dried in the loop conveyor dryer. The flakes were finely ground and dried in a modified impact mill, i.e. a Mikro Samplmill. Viscosities were determined as in example I. The operating conditions and results are summarized in table II.

TABLE II

| Feed rate, grams M.F.B./roll rev. | Flake thickness, microns | Roll speed, r.p.m. | Roll temp., °F. | Feed moisture content percent water | Roll pressure, lbs. gauge | 2 minute viscosity, cps. | 2 hour viscosity, cps. |
|---|---|---|---|---|---|---|---|
| 0.78 | 22.6 | 160 | 140 | 56 | 1,800 | 3,900 | 7,300 |
| 0.56 | 16.2 | 160 | 140 | 56 | 1,800 | 5,200 | 7,650 |
| 0.28 | 8.1 | 160 | 140 | 56 | 1,800 | 6,200 | 8,050 |
| 0.91 | 26.0 | 160 | 140 | 61 | 1,800 | 4,400 | 7,950 |
| 0.48 | 13.9 | 160 | 140 | 61 | 1,800 | 5,900 | 8,000 |
| 0.27 | 7.9 | 160 | 140 | 61 | 1,800 | 6,250 | 8,150 |
| 0.59 | 17.1 | 160 | 140 | 66 | 1,800 | 5,000 | 8,000 |
| 0.35 | 10.2 | 160 | 140 | 66 | 1,800 | 5,400 | 8,150 |

EXAMPLE III

In practicing a further embodiment of this invention the flakes were ground to coarse and fine particles and the viscosity at various mesh sizes determined. By grinding the flakes, it was determined that the viscosities obtained were slightly higher with the finely ground particles than with the coarse ground particles. The splits were prepared and flaked as in example I with a split moisture content of 49 percent and a flaking roll revolution of 96 r.p.m., a flaking pressure of 1,800 pounds and a feed rate of 0.47 grams per roll of revolution. The flake thickness was determined to be 17.39 microns. Viscosities were determined as in example I. The results are summarized in the table below. Original flakes B, were processed in a similar manner except the feed rate was 0.34 grams per roll of revolution.

TABLE III

| Product | Thickness in microns | Flake viscosity (cp.) 2 minute | Flake viscosity (cp.) 2 hour |
|---|---|---|---|
| Original flakes A (no milling) | 17.39 | 5,675 | 8,900 |
| Original flakes A, finely ground in the Mikro-Samplmill as is | 17.39 | 5,900 | 8,550 |
| Original flakes B (no milling) | 12.5 | 5,950 | 8,700 |
| Fraction B recovered between 30 and 100 mesh (65% yield) | 12.5 | 5,400 | 8,200 |
| Fraction B recovered below 100 mesh (35% yield) | 12.5 | 6,750 | 9,450 |
| Original flakes B finely ground in Mikro Samplmill high speed | 12.5 | 6,050 | 8,600 |

EXAMPLE IV

A further desirable characteristic of the product of this invention is the rapid rate of hydration in cold water. Endosperm splits were prepared as in example I. The splits were tempered to an equilibrium moisture content of 50 percent over approximately 1 hour. The laboratory flaker was set to flake to a particle thickness of $10\mu$ and $19\mu$ respectively. The roll pressure was 1,800 lbs. per square inch, gage at 110 roll r.p.m. and a roll temperature of about 140° F. The flakes were dried and ground in an impact mill and sifted into fractions of a mesh size as indicated below. Controls were run on a commercially available guar gum and on a laboratory flaked material having a particle thickness of $32\mu$. Viscosities for each sample were determined as indicated above.

TABLE IV

| | Percent weight of fraction | Viscosity, cp. 2 min. | Viscosity, cp. 2 hr. | Percent hydration (2 min./2 hr.)×100 |
|---|---|---|---|---|
| Sample A: Commercial guar gum mesh fraction as is | 100 | 850 | 5,950 | 14 |
| Fraction: | | | | |
| −50+100 mesh | 31.5 | 350 | 6,400 | 5.5 |
| −100+150 mesh | 52.4 | 850 | 6,100 | 14 |
| −150+200 | 4.2 | 1,800 | 5,300 | 34 |
| −200 | 8.1 | 3,250 | 5,000 | 65 |
| Sifting loss | 1.0 | | | |
| Sample B: 10μ flake thickness mesh fraction as is | 100 | 5,800 | 8,200 | 70 |
| Ground | 100 | 5,700 | 7,800 | 73 |
| −50+100 | 28.0 | 5,350 | 8,050 | 66 |
| −100+150 | 23.5 | 5,500 | 8,150 | 67 |
| −150+200 | 11.1 | 6,000 | 8,150 | 74 |
| −200 | 34.3 | 6,350 | 8,150 | 78 |
| Sifting loss | 3.0 | | | |
| Sample C: 19μ flake thickness mesh fraction as is | 100 | 5,450 | 8,500 | 64 |
| Ground | 100 | 5,350 | 8,250 | 65 |
| −50+100 | 31.8 | 4,950 | 8,250 | 59 |
| −100+150 | 26.6 | 4,950 | 8,300 | 59 |
| −150+200 | 10.4 | 5,600 | 8,450 | 65 |
| −200 | 28.4 | 6,400 | 8,550 | 77 |
| Sifting loss | 2.8 | | | |
| Sample D: 32μ flake thickness mesh fraction as is | 100 | 2,450 | 7,500 | 33 |
| Ground | 100 | 1,800 | 6,800 | 26 |
| −50+100 | 33.6 | 700 | 7,450 | 9.5 |
| −100+150 | 24.9 | 1,750 | 7,000 | 25 |
| −150+200 | 8.8 | 3,200 | 7,100 | 45 |
| −200 | 29.2 | 4,550 | 6,850 | 66 |
| Sifting loss | 4.5 | | | |

The commercial sample and the laboratory sample of 32μ flake thickness were similar and did not dissolve and hydrate at either the high rate or to the same high viscosity as material flaked to less than 18—20 microns thickness.

Further benefits are derived from the product of this invention in that coarse particles squeezed to less than 25 micron thickness form considerably fewer "gumballs" and "livers" in aqueous sols while hydrating to provide the same viscosity as finely ground gums. A "gumball" is defined as a lump of gum which has a dry center. A "liver" is defined as a lump of gum which has a wet center. Gumballs and livers are highly undesirable since smooth aqueous sols are required in many commercial applications, e.g. drilling mud, food stuffs, etc. Gumballs are characteristically formed by dispersion of finely ground gums.

By squeezing or flaking the splits to a thickness of less than 25 microns many processing and product advantages are obtained. In addition to the unexpected increase in viscosity as well as the possible rapid hydration without gumballs, a broad range of mesh sizes and hydration rates within each mesh may be chosen. The process of flaking as described herein will produce the desired results in all of the gum products, i.e. derivatives of guar gum such as hydroxypropyl guar, locust bean gum products, etc. Likewise, unexpected advantages are obtained from subsequent grinding such as higher viscosities obtained from finely ground products. The coarser products produced from the splits will also flow well with good hydration. Other advantages from the processing of splits by squeezing in a flaker or other equipment to a thickness of less than 25 microns will be readily apparent to those skilled in the art.

I claim:

1. A process for the production of mucilaginous material from leguminous seeds, the endosperm sections of which contain galactomannans comprised of tempering said endosperm sections to a moisture content of 30—70 percent by weight of water and squeezing said endosperm sections in said moistened condition to a thickness of less than 25 microns.

2. A process as in claim 1 wherein said endosperm sections are squeezed to a thickness of less than 25 microns by passing said endosperm sections between rolls.

3. A process as in claim 2 wherein said rolls are heated to 140 to 200° F.

4. A process as in claim 2 wherein said rolls are kept under sufficient pressure to keep the nip width between the rolls at less than 25 microns when passing said endosperm sections between said rolls.

5. A process as in claim 1 wherein said moistened endosperm sections are squeezed to less than 20 microns.

6. A process according to claim 1 wherein said squeezed endosperm sections are dried and ground.

7. A process according to claim 1 wherein said squeezed endosperm sections are dried to a moisture content of less than 15 percent by weight of water.

8. A process as in claim 1 wherein said squeezed endosperm sections are ground to less than about 150 mesh.

9. A process as in claim 1 wherein said squeezed endosperm sections are ground to greater than about 150 mesh.

10. A process as in claim 1 wherein said moistened endosperm sections are squeezed to less than 15 microns.

11. A process as in claim 1 wherein said endosperm sections are tempered to a moisture content of 43—62 percent by weight of water.

12. A leguminous seed containing galactomannans comprised of endosperm sections squeezed to a thickness of less than 25 microns.